US007823666B2

(12) United States Patent
Fähndrich

(10) Patent No.: US 7,823,666 B2
(45) Date of Patent: Nov. 2, 2010

(54) DRAWBAR UNIT FOR A DRAWBAR GOVERNED FLOOR CONVEYOR

(75) Inventor: Rainer Fähndrich, Tangstedt (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 241 days.

(21) Appl. No.: 12/103,442

(22) Filed: Apr. 15, 2008

(65) Prior Publication Data

US 2008/0265546 A1 Oct. 30, 2008

(30) Foreign Application Priority Data

Apr. 28, 2007 (DE) .................. 10 2007 020 112

(51) Int. Cl.
*B62D 1/00* (2006.01)
*B62D 51/04* (2006.01)

(52) U.S. Cl. .................. 180/19.1; 180/19.2; 180/19.3; 280/771; 280/775

(58) Field of Classification Search .............. 180/19.1, 180/19.2, 19.3; 280/771, 775
See application file for complete search history.

(56) References Cited

U.S. PATENT DOCUMENTS

| 2,913,062 | A | * | 11/1959 | Ulinski | 180/19.2 |
|---|---|---|---|---|---|
| 3,168,156 | A | * | 2/1965 | Ulinski | 180/19.2 |
| 3,223,192 | A | * | 12/1965 | Dorion et al. | 180/13 |
| 3,444,945 | A | * | 5/1969 | Coordes et al. | 180/19.3 |
| 3,720,423 | A | * | 3/1973 | Morris | 280/780 |
| 3,724,586 | A | * | 4/1973 | Goodacre | 180/274 |
| 3,738,441 | A | * | 6/1973 | Kemner | 180/65.1 |
| 4,444,284 | A | * | 4/1984 | Montemurro | 180/19.1 |
| 7,665,555 | B2 | * | 2/2010 | Rose et al. | 180/19.2 |
| 2005/0247508 | A1 | * | 11/2005 | Gilliland et al. | 180/402 |
| 2006/0231301 | A1 | * | 10/2006 | Rose et al. | 180/19.1 |
| 2007/0137904 | A1 |   | 6/2007 | Rose et al. | |

FOREIGN PATENT DOCUMENTS

| DE | 102004 003331 A1 | 8/2005 |
|---|---|---|
| DE | 202006015451 U1 | 3/2008 |
| EP | 2050652 A1 | 4/2009 |
| GB | 2 008 065 A | 5/1979 |
| GB | 2443 732 A | 5/2008 |
| JP | 2002 145597 A | 5/2002 |

* cited by examiner

*Primary Examiner*—Tony H. Winner
*Assistant Examiner*—Marc A Scharich
(74) *Attorney, Agent, or Firm*—Vidas, Arrett & Steinkraus

(57) ABSTRACT

A drawbar unit for a drawbar governed floor conveyor, in which a drawbar head is coupled to a vertical steering shaft, which optionally co-operates with a swiveling angle transmitter for an electronic steeling of the floor conveyor, wherein the steering shaft can be rotatably and axially fixedly mounted in a stationary bearing arrangement of the floor conveyor, wherein the drawbar head is connected to the upper end of a longitudinal guiding member, on which an upper portion of the steering shaft is axially guided, a lever is pivotably mounted on the guiding member, which engages with one arm into an axis parallel guiding channel on the steeling shaft such that a rotary union is produced, and an adjustment means mechanism acts on the lever in order to selectively bring the arm into clamping engagement with the steering shaft and to couple guiding member and steering shaft even axially.

10 Claims, 2 Drawing Sheets

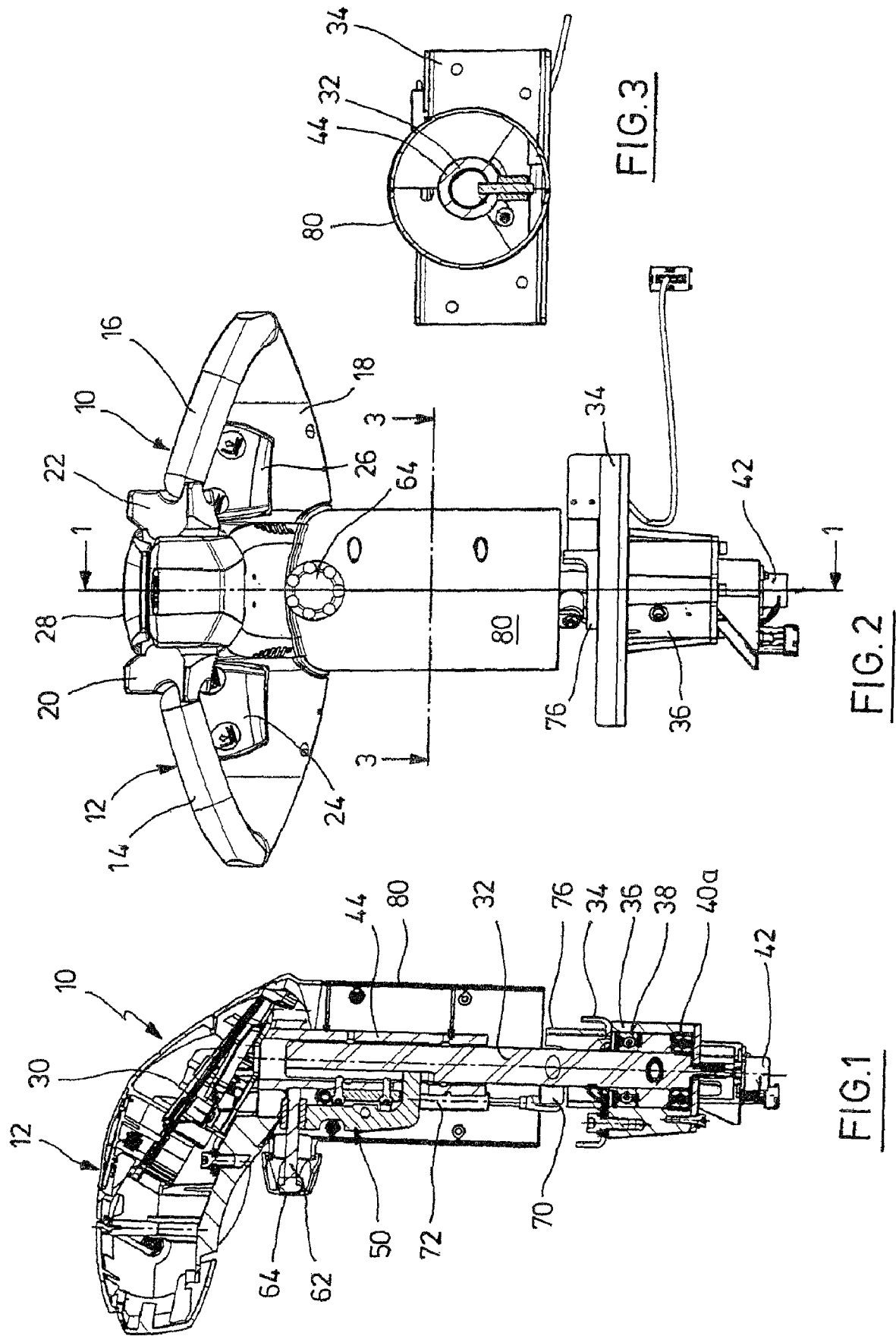

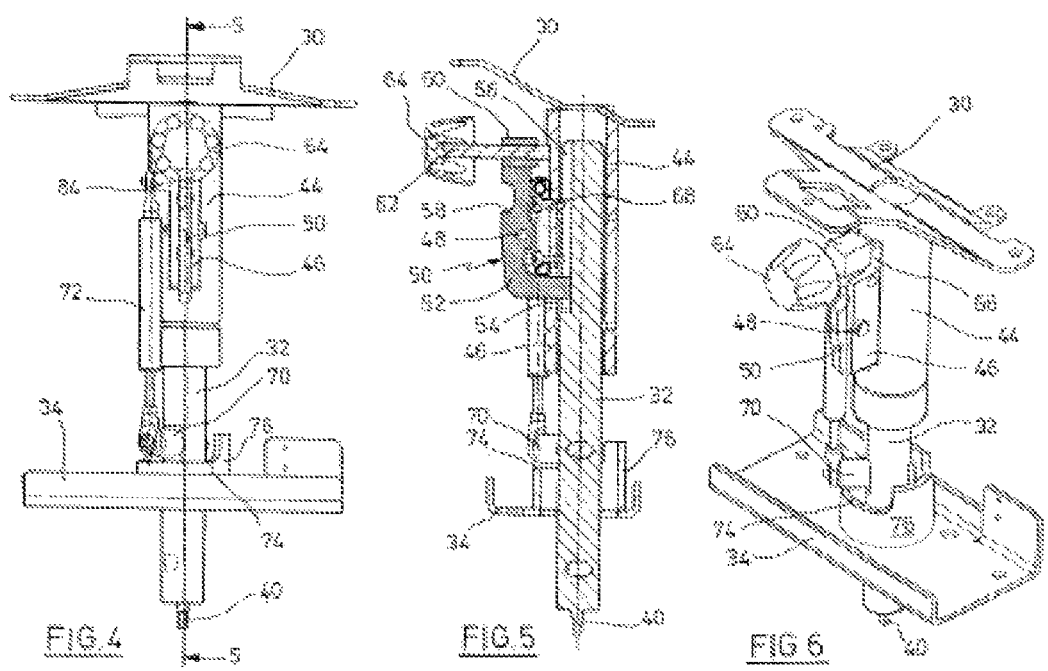

DRAWBAR UNIT FOR A DRAWBAR GOVERNED FLOOR CONVEYOR

CROSS-REFERENCE TO RELATED APPLICATIONS

Not applicable.

STATEMENT REGARDING FEDERALLY SPONSORED RESEARCH

Not applicable.

BACKGROUND OF THE INVENTION

In drawbar governed floor conveyors, it is distinguished between walkie- and rider vehicles. In walkie vehicles, the drawbar is bearing mounted swivelling around a horizontal axis on a fifth wheel, which on its part is rotatable around a vertical axis. In rider vehicles, the drawbar can be swivelled only around a vertical axis. In both cases, a drawbar head is provided at the end of the drawbar, which features operational controls for the actuation of the individual functions of the floor conveyor. Traction switch, operational controls for lifting and lowering, horn, emergency stop and so on belong to the same in particular. The present invention is related to drawbar units for rider floor conveyors.

Of course, the operators of the floor conveyors have a different body height. It is therefore purposeful to have the height of the drawbar head in the operation position adjustable to the body height. From DE 10 2004 003 331 A1, the entire contents of which is incorporated herein by reference, a drawbar governed walkie floor conveyor has become known, in which the vertical position of the horizontal swivelling axis is adjustable in its height.

The present invention is based on the objective to provide adjustability in the height for a rider floor conveyor, which allows continuous adjustability with simple means.

BRIEF SUMMARY OF THE INVENTION

In the drawbar unit of the present invention, the drawbar head is connected to the upper end of a longitudinal guiding member, on which an upper portion of the steering shaft is axially guided. On the guiding member, a lever is pivotably mounted, which engages with one arm into an axis parallel guiding channel on the steeling shaft, such that a rotary union is produced. Adjustment means act on the lever in order to selectively bring the arm into clamping engagement with the steering shaft and to couple the guiding member and the steering shaft axially and in the rotational direction.

When the clamping engagement between the lever and the steering shaft is released, the drawbar head can be arbitrarily brought to a desired height adjustment position, in certain limits. The actuation of the lever takes place via suitable adjustment means, in order to produce the clamping engagement or to release it, respectively.

According to one embodiment of the present invention, the guiding member is a pipe or a sleeve, and the lever arm extends through an opening in the pipe or in the sleeve. The bearing mounting of the lever takes place preferably on a bearing member, which is fixed on the outside of the guiding member.

According to another embodiment of the present invention, a two arm lever is provided, whose first arm co-operates with the steering shaft, and whose second arm co-operates with the adjustment means. According to a further embodiment of the present invention, the adjustment means can be formed by a thread spindle, which has a handle at the outer end. The thread spindle sits in a thread of the lever and is supported by its inner end on the guiding member. Thus, by rotating the thread spindle, the clamping engagement can be produced or released, respectively, depending on the rotational direction.

According to another embodiment of the present invention, the guiding channel is formed by an axis parallel groove in the steering shaft.

In order to facilitate the height adjustment, a further embodiment of the present invention provides that a gas pressure spring is connected to an attachment point of a steering shaft, whose other attachment point is situated on the guiding member. It is to be understood that another spring may also be used instead of a gas pressure spring.

According to a further embodiment of the present invention, it is provided that the gas pressure spring or even another spring, respectively, is attached on the steering shaft via a spigot and the spigot co-operates with stops which limit the swivelling angle of the steering shaft. According to a further embodiment of the present invention, the limitation is formed by a recess in a stationary stopper pipe, which surrounds the steering shaft in a radial distance.

BRIEF DESCRIPTION OF THE SEVERAL VIEWS OF THE DRAWINGS

An example of the realization of the present invention will be explained in more detail by means of drawings in the following.

FIG. 1 shows a section through a drawbar unit of the present invention according to FIG. 2, along the line 1-1.

FIG. 2 shows the rear view of the drawbar unit of the present invention.

FIG. 3 shows a section through the depiction according to FIG. 2, along the line 3-3.

FIG. 4 shows a similar depiction like FIG. 2, but omitting the drawbar head and a casing surrounding the drawbar shaft.

FIG. 5 shows a section through the depiction according to FIG. 4, along the line 5-5.

FIG. 6 shows the drawbar according to FIG. 4 in a perspective view.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated In the FIGS. 1 and 2, a complete drawbar unit 10 is depicted, which is installed into a not shown floor conveyor in a pre-assembled state. The drawbar unit has a drawbar head 12 with two butts 14, 16, which are arranged on the opposing sides of a supporting portion 18 and are directed with their free ends towards traction switches 20, 22. On the supporting portion are installed operational controls 24, 26 for lifting and lowering a load accommodation means of the not shown floor conveyor. The traction switches 20, 22 are installed on a central portion 28 of the drawbar head 12, which extends from the supporting portion 18 towards the rear side, i.e. towards the operator. Further details of the drawbar head will not be explained, because they are the state of the art. Supporting portion 18 and central portion 28 are composed of two shell portions, which can be recognised in FIG. 1. The supporting function is taken over by a supporting plate 30, which is depicted in more detail in FIGS. 4 to 6.

In the FIGS. 4 to 6, a steering shaft 32 can be recognised, which extends towards the downside through a flange plate 34. The flange plate is connected with the not shown frame of the floor conveyor, and on its part, it holds a bearing pot 36 with two rolling bearings 38, 40a. Thus, the steering shaft 32 is rotatably, but fixedly bearing mounted. A spigot 40 of the steering shaft 32 on the lower end extends into a sensor 42, which is also connected to the bearing pot 36 and serves for generating a desired steering value signal for a not shown electric steering of the not shown floor conveyor.

In FIGS. 4 and 5 in particular, it can be recognised that in its upper region, the steering shaft extends into a sleeve 44. On the upper end of the sleeve 44, the already described supporting plate 30 is attached. Therefore, the sleeve 44 is fixedly connected to the drawbar head 12. A bearing element 46 is attached on the outside of the sleeve 44. By means of a turnable pin 48, the fork-like bearing element 46 mounts a two arm lever 50. The lower arm 52 of the lever 50 is L-shaped, wherein an approximately horizontal leg extends through an opening 54 of the sleeve 44 into the interior. The leg engages into an axis parallel groove 56 of the steering shaft 32. In this way, a rotary union between steering shaft 32 and sleeve 44 is produced. In order to avoid a dead path, this guiding is as free from clearance as possible.

In the upper region of the upper arm 58 of the lever 50, a nut 60 is formed, into which a thread spindle 62 is screwed in. On the outer end, the thread spindle has a turning knob 64, and on the inner end it is supported by the outer side of the sleeve 44, which has a flat portion in the region of this support, as can be recognised at 66 in FIG. 6.

In FIG. 5, the fixation of the bearing element 46 with the aid of two screws 68 is shown.

The relative position of the nut 60 with respect to the sleeve 44 determines whether the lower lever arm 52 co-operates with the bottom of the groove 56 and thus produces a clamping connection between sleeve 44 and steering shaft 32, or whether it allows axial shift between these two parts. In the latter case, the drawbar head 12 can be adjusted in the vertical direction by pulling or pushing on it. When a non-positive fit is to be produced between these two parts, the turning knob 64 is turned for so long until a clamping connection is produced.

In the region of the flange plate 34, a radial spigot 70 is connected to the steering shaft 32. The one end of a gas pressure spring 72 is attached on that spigot. An additional spigot 84 is connected to the bearing element 46. Thus, a pre-tension is built up between the sleeve 44 and the steering shaft 32, which pre-tensions the drawbar head 12 towards the upside.

The spigot 70 moves inside a recess 74, which is formed in a stopper pipe 76, which is attached with one end on the flange plate 34 and coaxially surrounds the steering shaft 32. The ends of the recess 74 determine the maximum swivelling angle of the steering shaft 32.

As results from FIGS. 1 and 2, the described drawbar unit is surrounded below the drawbar head 12 by a pipe-shaped casing 80, which extends towards the downside up to the stopper pipe 76 and has a passage for the thread spindle 62. The turning knob 64 can be mounted on the covering 80.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A drawbar unit for a drawbar governed floor conveyor, in which a drawbar head is coupled to a vertical steering shaft, which cooperates with a swiveling angle transmitter for an electronic steering of the floor conveyor, wherein the steering shaft can be rotatably and fixedly mounted in a stationary bearing arrangement of the floor conveyor, characterized in that the drawbar head (12) is connected to an upper end of a longitudinal guiding member, on which an upper portion of the steering shaft (32) is axially guided, a lever (50) is pivotally mounted on the guiding member, which engages with a first lever arm (52) into a parallel guiding channel on the steering shaft (32) such that a rotary union is produced, and adjustment means act on the lever (50) in order to selectively bring the first lever arm (52) into clamping engagement with the steering shaft (32) and to couple the guiding member and the steering shaft (32).

2. A drawbar unit according to claim 1, characterized in that the guiding member is a pipe or a sleeve (44) and the first lever arm (52) is guided through an opening (54) in the pipe or in the sleeve (44).

3. A drawbar unit according to claim 1, characterized in that a bearing member (46) for the lever (50) is attached on the guiding member.

4. A drawbar unit according to claim 1, characterized in that the lever (50) has two lever arms, the first lever arm (52) co-operates with the steering shaft (32), and a second lever arm (58) co-operates with a nut (60).

5. A drawbar unit according to claim 4, characterized in that the adjustment means features a thread spindle (62) with a handle (64) at an outer end, which is screwed into a thread of the lever (50) and whose inner end is supported on the guiding member.

6. A drawbar unit according to claim 1, characterized in that the guiding channel is formed by a parallel groove (56) of the steering shaft (32).

7. A drawbar unit according to claim 1, characterized in that a gas pressure spring (72) is arranged between an attachment point on the steering shaft (32) and an attachment point on the guiding member.

8. A drawbar unit according to claim 7, characterized in that the gas pressure spring (72) is attached on the steering shaft (32) via a radial spigot (70) and the spigot (70) cooperates with stops in order to limit a swiveling angle of the steering shaft (32).

9. A drawbar unit according to claim 8, characterized in that the stops are formed by a recess in a stationary stopper pipe (76), which surrounds the steering shaft in a radial distance.

10. A drawbar unit according to claim 1, characterized in that the steering shaft (32) is mounted in a bearing arrangement (36) rotatably, but fixedly, and the bearing arrangement with the steering shaft, the guiding member and the drawbar head attached on the guiding member form a separate unit which can be installed into a floor conveyor.

* * * * *